United States Patent Office 3,388,531
Patented June 18, 1968

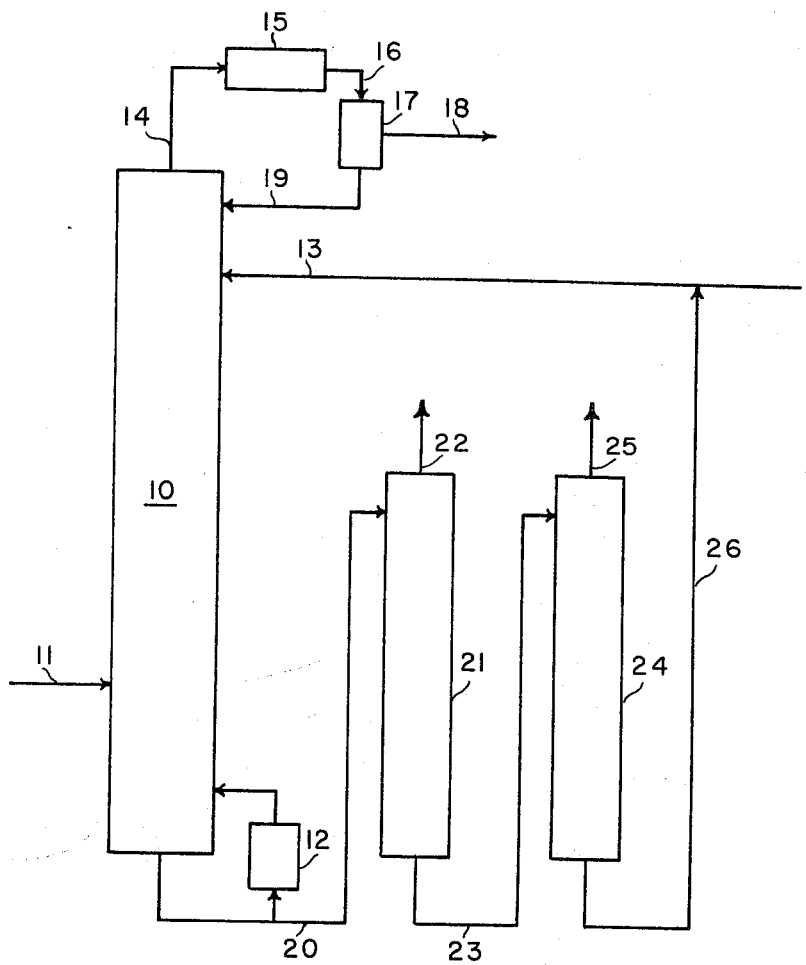

3,388,531
PURIFICATION OF HYDROCARBONS
William L. Bolles, Seabrook, and George D. Chappell and Walter H. Stanton, Texas City, Tex., assignors to Monsanto Company, a corporation of Delaware
Filed Jan. 3, 1964, Ser. No. 335,593
16 Claims. (Cl. 55—64)

The present invention relates to a process for the separation of mixtures of hydrocarbons of varying degrees of unsaturation. More particularly, the present invention relates to a process for the separation of more unsaturated hydrocarbons from less unsaturated hydrocarbons by extractive distillation. Specifically, the present invention relates to the purification of hydrocarbons by the selective removal of more unsaturated hydrocarbon impurities therefrom by extractive distillation with an N,N-dialkylacylamide solvent.

In the manufacture of mono-olefins of high purity, it is generally necessary to employ one or more purification steps whereby the acetylene and/or diolefinic hydrocarbon impurities are removed from the mono-olefin stream. One of the most useful purification methods involves the extractive distillation of mono-olefin hydrocarbon streams with particular selective solvents. Among the solvents particularly effective for the purification of mono-olefin hydrocarbons by extractive distillation are the N,N-dialkylacylamides, particularly dimethylformamide and dimethylacetamide. Generally the extractive distillation of the hydrocarbon stream is carried out in a conventional plate or packed absorption column. Though the use of N,N-dialkylacylamides in conventional purification columns to selectively absorb the more unsaturated hydrocarbons such as acetylenic and diolefinic hydrocarbons from mixtures with the less unsaturated hydrocarbons such as mono-olefin hydrocarbons has been practiced for many years, such processes fail in several respects to achieve maximum effectiveness.

One of the primary causes of the failure of the N,N-dialkylacylamides to reach maximum utilization in the removal of acetylenic and diolefinic hydrocarbon impurities from mono-olefin hydrocarbon streams lies in the foaming tendencies of the system. Excessive foaming reduces column capacity. The excessive foaming of extraction systems employing N,N-dialkylacylamides as solvents, as well as other solvents useful in the separation of more unsaturated hydrocarbons from less unsaturated hydrocarbons, generally results from absorption of quantities of hydrocarbon in excess of 20–25 mol percent of hydrocarbon in the solvent. Thus, to prevent foaming, it has been the practice in the past to employ combinations of temperature and pressure such as to assure absorption of less than the 20–25 mol percent hydrocarbon absorbed in the solvent. However, such practice is subject to several disadvantages. The primary disadvanage of operating the extractive distillation process in a manner to prevent absorption of hydrocarbons in the solvent in excess of these solubility limits is that larger volumes of solvent are necessary for processing a given quantity of hydrocarbon, which results in the need for columns of greater size. Another disadvantage of operating the extractive distillation process in temperature and pressure ranges necessary to prevent absorption of greater than the above absorption limits is a significant reduction in the selectivity of the solvent for the more unsaturated hydrocarbons. Also, at the higher temperatures and/or lower pressures necessary to prevent foaming, there is a significant increase in the amount of solvent carried overhead from the column in admixture with the overhead products.

It is an object of the present invention to provide a new and improved process for the separation of mixtures of hydrocarbons of varying degrees of unsaturation. Another object of the present invention is to provide a process whereby more unsaturated hydrocarbons may be separated from less unsaturated hydrocarbons by extractive distillation. Yet another object of the present invention is to provide a process whereby more unsaturated hydrocarbons may be separated from less unsaturated hydrocarbons by extractive distillation in the presence of N,N-dialkylacylamide solvents. It is also an object of the present invention to provide a new and novel solvent system for the separation of more unsaturated hydrocarbons from less unsaturated hydrocarbons by extractive distillation. Additional objects will become apparent from the following description of the invention herein disclosed.

In fulfillment of these and other objects, it has been found that more unsaturated hydrocarbons may be more effectively separated from less unsaturated hydrocarbons by a process which comprises contacting a mixture of such hydrocarbons of varying degrees of unsaturation with an N,N-dialkylacylamide solvent containing 10 to 1000 parts per million of a polymeric organo-silicon compound. The present invention provides several advantages. The present invention allows operation of the extractive distillation column at lower temperatures resulting in a reduction in the concentration of N,N-dialkylacylamide solvent in the purified gases taken overhead from the absorption column. Further, as was noted above, the lower the temperature at which the absorbent column may be operated, the better is the absorption selectivity between the more unsaturated and the less unsaturated hydrocarbons. Also, substantially less solvent is necessary to effect a particular separation in the present process as will be seen from Example II below. An additional advantage from a commercial standpoint is that the closer in temperature to the dewpoint of the hydrocarbon that the N,N-dialkylacylamide absorption column may be operated, the less refrigeration is required to cool the overhead vapors to provide liquid reflux within the absorber column for scrubbing entrained N,N-dialkylacylamide solvent from the product gases.

To further describe the present invention, reference is made to the accompanying drawing which presents a schematic presentation of a preferred embodiment of the present invention. Referring to the drawing, a feed mixture comprising hydrocarbons of varying degrees of unsaturation is introduced into fractionating or absorption column 10 through line 11. Generally, the hydrocarbon is introduced in the vapor phase. The solvent of the present invention is introduced into the column in the liquid phase through line 13 which is located at a point in column 10 above line 11. The solvent flows down through column 10, countercurrently contacting upwardly flowing vapors of the feed mixture. As the solvent and hydrocarbon feed are contacted, the more unsaturated hydrocarbons are preferentially absorbed. The solvent and absorbed hydrocarbons pass down through the column and are circulated through and heated in reboiler 12 which partially strips absorbed hydrocarbons from the solvent and vaporizes these hydrocarbons which then pass up through the column, the purpose of this operation being to reduce the concentration of the less unsaturated in the solvent leaving the bottom of the column. The portion of the feed mixture which is not absorbed by the solvent is removed from the fractionating column 10 by means of line 14 and passes through condenser 15 in which it is partly condensed. From condenser 15, the partially condensed hydrocarbons are passed into separator 17 by means of line 16. In separator 17 pure hydrocarbon vapors are separated from the partially condensed stream and removed by line 18. The liquified portion of the hydrocarbon is then returned to column 10 as reflux through line 19. The solvent enriched with the absorbed, more unsaturated hydrocarbons is removed from column 10 by means of line 20 and passed into a prestripper column 21 in which the majority of the absorbed less unsaturated hydrocarbons are stripped from the solvent. These hydrocarbons exit distillation column 21 by line 22 and the solvent containing the remaining more unsaturated hydrocarbons passes from distillation column 21 and is introduced into fractionating column 24 by means of line 23. In fractionating column 24, the remaining more unsaturated hydrocarbons, as well as other impurities in the solvent, are stripped from the solvent and taken overhead by means of line 25. The purified solvent is then recycled to the absorption column by means of lines 26 and 13.

Many modifications of the process of the present invention, as described in reference to the accompanying drawing, will become readily apparent to those skilled in the art and may be practiced without departing from the spirit and scope of the present invention.

In order to demonstrate and to further describe the present invention, the following examples are presented.

*Example I*

In order to demonstrate the efficacy of the present invention in preventing excessive foaming, dimethylformamide was placed to a depth of 3 inches in a glass column having an average diameter of 1 inch and a length of 28 inches. Gaseous propylene was then passed into the column at a rate of 18.5 pounds per hour while the pressure was maintained at 85 p.s.i.g. The resulting foam height on top of the column of solvent and the amount of propylene absorbed by the solvent was determined at various temperature levels and is presented in Table I below. A second experiment was carried out in the same manner with the exception that approximately 100 p.p.m. of a polydimethyl siloxane marketed commercially as Dow-Corning Antifoam A was added to the dimethylformamide in accordance with the present invention. The polydimethyl siloxane was added to the dimethylformamide in admixture with 0.04 ml. of xylene which acted as a dispersing medium for the antifoam material. The temperature within the column was again continuously varied with the foam height within the column and the amount of propylene absorbed by the solvent being measured at the various temperature levels. Table II below records the foam heights and amounts of propylene absorbed at the various temperatures as obtained by the present invention.

TABLE I

| Foam Height, Inches | Temperature, ° F. | Mole percent Propylene Absorbed |
|---|---|---|
| 11 | 58 | 24 |
| 14 | 54 | 31 |
| 21 | 51 | 39 |
| 23 | 50 | 40 |

TABLE II

| Foam Height, Inches | Temperature, ° F. | Mole percent Propylene Absorbed |
|---|---|---|
| 9 | 59 | 23 |
| 9 | 56 | 29 |
| 10 | 55 | 30 |
| 10 | 53 | 35 |
| 10 | 52 | 37 |
| 10 | 51 | 39 |

The efficacy of the present invention is clearly demonstrated by a comparison of the foam heights in Table I with those in Table II. Also, the mole percent propylene absorbable in the DMF at the various temperatures without significant foaming as shown in Table II clearly demonstrates one of the primary advantages of the present invention.

The unexpectedness of the present invention is clearly pointed up by the results obtained from testing several commercially available anti-foam agents. These anti-foam agnts were added to dimethylformamide and tested in the manner described above in Example I. The results of these tests are given in the following table.

| Anti-Foam Agent | Amount (p.p.m.) | Temp. (° F.) | Foam Height (Inches) | Mole Percent Propylene Absorbed |
|---|---|---|---|---|
| $C_{16}$-$C_{18}$ Fatty Alcohol [1] | 100 | 56 | 12 | 29 |
| | | 54 | 23 | 33 |
| | | 53 | 25 | 35 |
| $C_{12}$, $C_{14}$ and $C_{15}$ Fatty Alcohol [2] | 500 | 57 | 12 | 26 |
| | | 55 | 21 | 30 |
| | | 54 | 27 | 33 |
| Alkylaryl Polyether Alcohol [3] | 500 | 58 | 12 | 24 |
| | | 54 | 19 | 33 |
| | | 53 | 23 | 35 |
| Tributyl Phosphate | 1,000 | 56 | 12 | 29 |
| | | 54 | 20 | 32 |
| | | 53 | 24 | 35 |

[1] Rohm & Haas Dytol E-46.
[2] Rohm & Haas Dytol B-35.
[3] Rohm & Haas Triton X-15.

It should be noted that not only did these anti-foam agents fail to reduce the foam in the system but with the first, second and fourth, the foam height was actually increased by addition of the anti-foam agent.

In order to demonstrate the substantial advantage of the present invention in actual operation, Example II is presented.

*Example II*

Two separate extractive distillation runs were made in a multistage plate column with a propylene feed containing 20,000 p.p.m. of propadiene and 10,000 p.p.m. of methylacetylene. The solvent in one run, hereinafter designated Run A, was dimethylformamide while the solvent in the second run, hereinafter designated Run B, was dimethylformamide containing 100 p.p.m. of the polydimethyl siloxane anti-foam of Example I. Pressure in each run was 88 p.s.i.g. Run A was carried out at 70° F. and Run B at 50° F. In each run the amount of propylene product obtained overhead was the same and the propadiene and methylacetylene content of the product propylene was the same as 50 p.p.m. and less than 5 p.p.m. respectively, in each of the runs. The very significant difference in the two runs is in the amount of dimethylformamide necessary to accomplish the separation. In Run A, the moles of dimethylformamide per mole of propylene feed was 1.88 while for Run B this value was 1.50. This represents a 25% increase in the amount of propylene which may be processed with a given quantity of dimethylformamide. Such an increase in capacity results from the lower temperature operation which is made possible through the use of the present invention.

The novel solvent system of the present invention comprises an N,N-dialkylacylamide solvent in combination with a polydimethyl siloxane anti-foam agent. The dialkylacylamides contemplated as solvents in the present invention are those having the formula

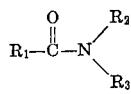

wherein $R_1$ is an alkyl hydrocarbon radical of one to four carbon atoms and $R_2$ and $R_3$ are alkyl hydrocarbon radicals of one to five carbon atoms. The alkyl hydrocarbon radicals may be either straight- or branched-chain, but preferably are straight-chain. Several non-limiting examples of the N,N-dialkylacylamides are dimethylformamide, dimethylacetamide, dimethylpropionamide, dimethylbutyramide, diethylformamide, diethylacetamide, diethylpropionamide, diethylbutyramide, methylethylformamide, methylethylpropionamide, dipropylacetamide, ethylpentylformamide, dibutylacetamide, ethylbutylpropionamide, dibutylpropionamide, methylpentylacetamide, and the like. The most useful N,N-dialkylacylamides are those in which $R_1$ is an alkyl hydrocarbon radical of from one to two carbon atoms and $R_2$ and $R_3$ are alkyl hydrocarbon radicals of one to three carbon atoms and wherein $R_2$ and $R_3$ are the same. The present invention finds its greatest utility when the dialkylacylamide solvent is dimethylformamide or dimethylacetamide, preferably dimethylformamide.

The second component of the solvent system of the present invention is an anti-foaming agent which is one from the class of organosilicon polymers. The materials most effective in the present invention are the polydimethyl siloxane which are represented by the empirical formula,

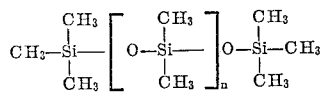

wherein $n$ is an integer resulting in a compound having a viscosity of at least 40 centistokes at 25° C. and a specific gravity at 77° F. of at least 0.96. Preferably, the polydimethyl siloxane is one having at least 100 centistokes at 25° C. The polydimethyl siloxane compounds are colorless, odorless, inert liquids which vary in viscosity upwardly from about 1 centistoke at 25° C. to about a million centistokes. A particularly preferred group of these polydimethyl siloxanes are those having a viscosity in excess of 250 centistokes at 25° C. and a specific gravity at 77° F. of 0.97 or greater. Included in these preferred materials are those marketed as Dow-Corning Antifoam A, Dow-Corning Antifoam Q, G. E. Antifoam 66, and the like.

In most instances, it will be desirable to use the anti-foam agent of the present invention in dispersion in a suitable inert medium. These inert mediums generally are relatively high molecular weight hydrocarbons, i.e., 6 to 12 carbon atoms. Among the suitable dispersing mediums are such hydrocarbons as xylene, diethylbenzene, ethylbenzene, triethylbenzenes, and trimethylbenzenes, toluene, cyclohexane, gasoline fractions, diesel fuels, kerosene, naphtha, and the like.

Such other solvents as alcohols of greater than 5 carbon atoms may also be used as dispersing mediums for the anti-foam agent. Among the alcohols useful in this instance are 2-ethyl-1-hexanol, 2-methyl-1-hexanol, 2-propyl-1-pentanol and the like. Other useful dispersing mediums are amyl acetate, methylene chloride, perchloroethylene, ethylether, tetra chloromethylene and similar solvents. Generally, the criteria for judging a suitable dispersing medium for the anti-foam agent are (1) that it be soluble in the N,N-dialkylacylamide solvent, (2) that it be non-foaming, (3) that it be of sufficiently high boiling point that it is will not cause a problem of separating the product gases from the dispersing medium, (4) that it be of a boiling point such as to be readily stripped from the N,N-dialkylacylamide solvent, and (5) that it be one which does not contaminate the system with undesirable impurities. Generally, hydrocarbon solvents are preferred.

When the anti-foam agents of the present invention are dispersed in a dispersing medium, the weight percent anti-foam agent in the dispersing medium is generally within the range of 2 to 50. However, the amount of anti-foam agent dispersed in the medium will preferably be from 5 to 15 percent by weight.

The present invention is primarily directed to the separation of more unsaturated hydrocarbons from the less unsaturated hydrocarbons. According to the present invention, paraffins may be separated from olefins, diolefins, acetylenes, etc. Olefins may be separated from diolefins, triolefins, acetylenes, etc., diolefins separated from acetylenes, etc. Usually, the hydrocarbon mixtures separated according to the present invention are comprised primarily of hydrocarbons having no greater than 7 carbon atoms. In the preferred practice, the present invention finds its greatest utility in the purification of normally gaseous mono-olefin hydrocarbons, i.e., ethylene, propylene, and butenes, by separating such hydrocarbons from acetylenic and diolefinic hydrocarbons of similar boiling points, i.e., acetylene, methylacetylene, propadiene and butadienes. In its particularly preferred utility, the present invention is used for the separation of methylacetylene and/or propadiene from propylene to produce high purity propylene.

In practicing the present invention, the amount of the above-described anti-foam agent used generally will be from 10 to 1000 parts per million of N,N-dialkylacylamide solvent. The upper limit is primarily one of economical practicability since virtually any amount of the anti-foam agent may be used; however, above this upper limit no further improvement in anti-foam characteristics of the system is obtained. Also, in some instances, too great an excess of anti-foam may interfere with the efficiency of the separation column. In the preferred practice of the present invention, the amount of anti-foam agent used is 60 to 100 parts per million of the N,N-dialkylacylamide solvent.

In operating the present extractive distillation process, the temperatures will vary quite widely depending upon the hydrocarbon mixture being separated. Generally, in the usual practice of the present invention, temperatures within the range of 0 to 200° F. will normally be employed. However, the temperatures optimum for separating, for example, a $C_3$ hydrocarbon mixture, are substantially different from those optimum for a $C_7$ hydrocarbon mixture. Optimum temperatures may be readily determined by those skilled in the art having the present teachings before them. When the present invention is utilized in accord with the particularly preferred utility heretofore defined temperatures of 20 to 100° F. are commonly employed. Pressures will vary widely, if not more widely, than temperatures within the range of utilization of the present invention but for the above temperature range generally will be from 5 to 10 atmospheres. The most meaningful limitations on both pressures and temperatures for practicing the present invention are in terms of solubility of hydrocarbon in the solvent. Thus, regardless of the hydrocarbon system being treated in accordance with the present invention, the proper temperatures and pressures are those which result in the solvent absorbing 20 to 50 mol percent of the hydrocarbons. To determine the temperatures and pressures which produce such results is readily within the ability of those skilled in the art.

Usually the process of the present invention is carried out in an absorber column which is a conventional plate column or a packed column. It is somewhat preferred to use a plate column. By plate column is meant those columns having a series of trays containing contact improvement modifications and includes ordinary perforated trays, bubble cap trays, valve type trays and the like. In the particularly preferred manner of carrying out the present process, the absorber column is one having an in-use theoretical plate efficiency of 70 to 100% as determined by techniques well known to those skilled in the art. Usually the hydrocarbon feed is introduced into the column at a point below the midpoint of the column with the dialkylacylamide solvent being introduced into the column at a point above the point of entry of the hydrocarbon feed.

In practicing the present invention, the amount of N,N-dialkylacylamide solvent containing anti-foam agent contacted with the feed mixture is generally 1.4 to 2.0 mols of solvent per mol of feed mixture. Preferably, however, the mol solvent to feed ratio is within the range of from 1.4:1 to 1.6:1.

When the solvent system of the present invention becomes enriched with absorbed materials to an extent such that it is necessary to refine the solvent to remove the absorbed components, this may be done by conventional stripping methods. Generally, the rich solvent will be subjected to a simple stripping operation in conventional distillation equipment.

What is claimed is:

1. A process for separating a hydrocarbon mixture comprised of at least two different hydrocarbons of different degrees of unsaturation, said process comprising subjecting said mixture to extractive distillation with a solvent system comprising a mixture of an N,N-dialkylacylamide and at least 10 to 1000 p.p.m. of a polydimethyl siloxane of the formula

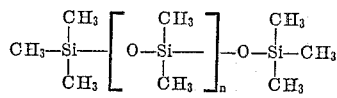

wherein $n$ is an integer resulting in a compound having a viscosity of at least 40 centistokes at 25° C. and a specific gravity at 77° F. of at least 0.96.

2. The process of claim 1 wherein the hydrocarbon mixture is one comprised of hydrocarbon of no greater than 7 carbon atoms.

3. The process of claim 1 wherein the hydrocarbon mixture is one comprised of a mixture of normally gaseous mono-olefin hydrocarbons and a hydrocarbon selected from the group consisting of normally gaseous diolefinic hydrocarbons, normally gaseous acetylenic hydrocarbons and combinations thereof.

4. The process of claim 1 wherein the temperature and pressure are such as to cause 20 to 50 mole percent hydrocarbon to be absorbed in the solvent.

5. The process of claim 1 wherein the N,N-dialkylacylamide solvent is one selected from the group consisting of dimethyl formamide and diethyl acetamide.

6. The process of claim 5 wherein the N,N-dialkylacylamide solvent is dimethyl formamide.

7. The process of claim 5 wherein the N,N-dialkylacylamide solvent is dimethyl acetamide.

8. The process of claim 1 wherein the mole ratio of the solvent system to the hydrocarbon feed mixture is approximately 1.4 to 2.0.

9. The process of claim 1 wherein the amount of polydimethyl siloxane present in the solvent system is approximately 60 to 100 p.p.m.

10. A solvent system effective for the selective extractive distillation of hydrocarbon mixtures, said hydrocarbon mixtures comprising at least two different hydrocarbons of different degrees of unsaturation, said solvent system comprising an N,N-dialkylacylamide containing 10 to 1000 p.p.m. of a polydimethyl siloxane having the formula

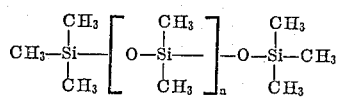

wherein $n$ is an integer resulting in a compound having a viscosity of at least 40 centistokes at 25° C. and a specific gravity at 77° F. of at least 0.96.

11. The solvent system of claim 10 wherein the hydrocarbon mixture is one comprised of hydrocarbon of no greater than 7 carbon atoms.

12. The solvent system of claim 10 wherein the hydrocarbon mixture is one comprised of a mixture of normally gaseous mono-olefin hydrocarbon and a hydrocarbon selected from the group consisting of normally gaseous diolefinic hydrocarbons, normally gaseous acetylenic hydrocarbons and combinations thereof.

13. The solvent system of claim 10 wherein the N,N-dialkylacylamide is one selected from the group consisting of dimethyl formamide and dimethyl acetamide.

14. The process of claim 12 wherein the N,N-dialkylacylamide solvent is dimethyl formamide.

15. The process of claim 12 wherein the N,N-dialkylacylamide solvent is dimethyl acetamide.

16. The solvent system of claim 10 wherein the polydimethyl siloxane is present in an amount of 60 to 100 p.p.m.

References Cited

UNITED STATES PATENTS

| | | | |
|---|---|---|---|
| 2,146,448 | 2/1939 | Scott et al. | 55—65 |
| 2,750,435 | 6/1956 | Fetchin | 203—51 |
| 2,846,443 | 8/1958 | Malusa et al. | 55—64 |
| 2,905,597 | 9/1959 | Stafford et al. | 203—57 |
| 3,013,952 | 12/1961 | Clay | 55—63 |
| 3,134,726 | 5/1964 | Hochgraf | 55—64 |
| 2,610,942 | 9/1952 | Read | 208—322 |

SAMIH N. ZAHARNA, *Primary Examiner.*

REUBEN FRIEDMAN, *Examiner.*

C. HART, *Assistant Examiner.*